United States Patent [19]

Nagata et al.

[11] Patent Number: 5,058,035
[45] Date of Patent: Oct. 15, 1991

[54] APPARATUS WHICH RECORDS DATA ON THE BASIS OF STORED FORMAT INFORMATION

[75] Inventors: Satoshi Nagata, Tama; Masaru Igarashi, Kawasaki, both of Japan

[73] Assignee: Canon Kabushiki Kaisha, Tokyo, Japan

[21] Appl. No.: 517,405

[22] Filed: May 2, 1990

Related U.S. Application Data

[63] Continuation of Ser. No. 89,339, Aug. 25, 1987, abandoned.

[30] Foreign Application Priority Data

Aug. 30, 1986 [JP] Japan .............................. 61-202715
Aug. 30, 1986 [JP] Japan .............................. 61-202720

[51] Int. Cl.5 .............................................. G06F 3/12
[52] U.S. Cl. .................................................. 364/518
[58] Field of Search ........ 364/518, 519, 200 MS File, 364/138, 464.01

[56] References Cited

U.S. PATENT DOCUMENTS

| | | | |
|---|---|---|---|
| 4,170,886 | 12/1983 | Heath | 364/519 |
| 4,380,796 | 4/1983 | Ostby | 364/138 X |
| 4,433,377 | 2/1984 | Eustis et al. | 364/200 |
| 4,476,542 | 10/1984 | Crean et al. | 364/900 |
| 4,497,040 | 1/1985 | Gomes et al. | 364/138 X |
| 4,520,455 | 5/1985 | Crean et al. | 364/900 |
| 4,573,115 | 2/1986 | Halgrimson | 364/138 |
| 4,628,457 | 12/1986 | Manduley | 364/464 |

Primary Examiner—Dale M. Shaw
Assistant Examiner—Mark K. Zimmerman
Attorney, Agent, or Firm—Fitzpatrick, Cella, Harper & Scinto

[57] ABSTRACT

In the disclosed recording apparatus, the printing condition of a format, for example of a business form, can be suitably modified by an instruction from a host computer. The modified format is then stored in a nonvolatile memory, so that it need not be readjusted repeatedly for repeated printing operation.

26 Claims, 10 Drawing Sheets

| IMAGE-MOVEMENT COMMAND | X | Y | WIDTH | LENGTH | X' | Y' |
|---|---|---|---|---|---|---|
| 801 | 802 | 803 | 804 | 805 | 806 | 807 |
| 808 | 802 | 803 | 804 | 805 | 806 | 807 |
| IMAGE-COPY COMMAND | X | Y | WIDTH | LENGTH | X' | Y' |

APPARATUS WHICH RECORDS DATA ON THE BASIS OF STORED FORMAT INFORMATION

This application is a continuation of application Ser. No. 07/089,339, filed Aug. 25, 1987, now abandoned.

BACKGROUND OF THE INVENTION

1. Field of the Invention

The present invention relates to a recording apparatus for image recording on a recording medium according to information sent from a host apparatus.

2. Related Background Art

Image recording apparatus, such as a printer, is generally equipped with dip switches for enabling the operator to modify the functions to a certain extent. However such dip switches can only cope with modifications of rather limited functions, for example setting of interface conditions.

Recently there are also known apparatus allowing the operator to select functions through an intelligent operation panel, by the use of a non-volatile RAM instead of the dip switches. However, such apparatus, still requiring manipulation of the operation panel, only serves to facilitate the setting with the dip switches and allows the selection of individual functions only.

There are also known, as disclosed in the U.S. Pat. No. 4,059,833, apparatus in which the parameters such as the character size and the line pitch are instructed by a host apparatus such as a host computer to a printer. However such parameters have to be set to the printer by the operator every time the power supply is turned on. Also in certain apparatus such as word processors, the parameter settings of the printer are stored in a floppy disk or a non-volatile memory provided in the host apparatus, but the operator is required to provide an instruction for reading the stored settings from said floppy disk or the like. Also in such apparatus a considerable load is unavoidable on the part of the host apparatus.

Recent development of non-impact printers, for printing characters in the form of a group of dots, has made it possible to print not only characters but also to form lines and pictures. For this reason, instead of the conventional printout of characters on an already printed business form sheet, the printout can be made by storing data for format pattern in advance and overlaying the thus stored format pattern with newly supplied data, as described in the U.S. Pat. No. 4,059,833. Such process is called form overlay.

The form and print data are usually designed separately, so that they often do not fit each other in the actual printout. It therefore becomes necessary, as shown in FIG. 7, to move a pattern ABCD to a position A'B'C'D'. In such case it has conventionally been necessary to redesign the form or the print data, involving cumbersome work.

Also in case of forming, as shown in FIG. 9, the same image in different positions 408 and 409, it has been necessary to send the same data repeatedly from the host apparatus, so that the efficiency in image forming time cannot be improved.

There is also known an apparatus in which an image displacement is made on a display such as a cathode ray tube and the displaced image is then printed, as disclosed in the U.S. patent application Ser. No. 914,150. However the image displacing process, conducted in the host apparatus, imposes a significant load thereon, and other processes cannot be executed during such image displacing process.

SUMMARY OF THE INVENTION

An object of the present invention is to provide a recording apparatus not associated with the above-mentioned drawbacks.

Another object of the present invention is to provide a recording apparatus which enables setting of the initial conditions therefor from a host apparatus such as a host computer, and which stores said set conditions in a rewritable non-volatile memory to dispense with the resetting operation even when the power supply is cut off.

Still another object of the present invention is to provide a recording apparatus in which the pattern of a desired area can be moved to a desired position in response to an instruction from the host apparatus.

Still another object of the present invention is to provide a recording apparatus capable of reducing the time required for preparing a form preparation, without redesigning of the data for a form.

Still another object of the present invention is to provide a recording apparatus capable of saving time required for the transfer of the same data and enabling efficient image formation.

The foregoing and still other objects of the present invention, and the advantages thereof, will become fully apparent from the following description to be taken in conjunction with the attached drawings.

DETAILED DESCRIPTION OF THE PREFERRED EMBODIMENTS

Now the present invention will be clarified in detail by embodiments thereof shown in the attached drawings.

LASER BEAM PRINTER (FIG. 2)

Figure 2:
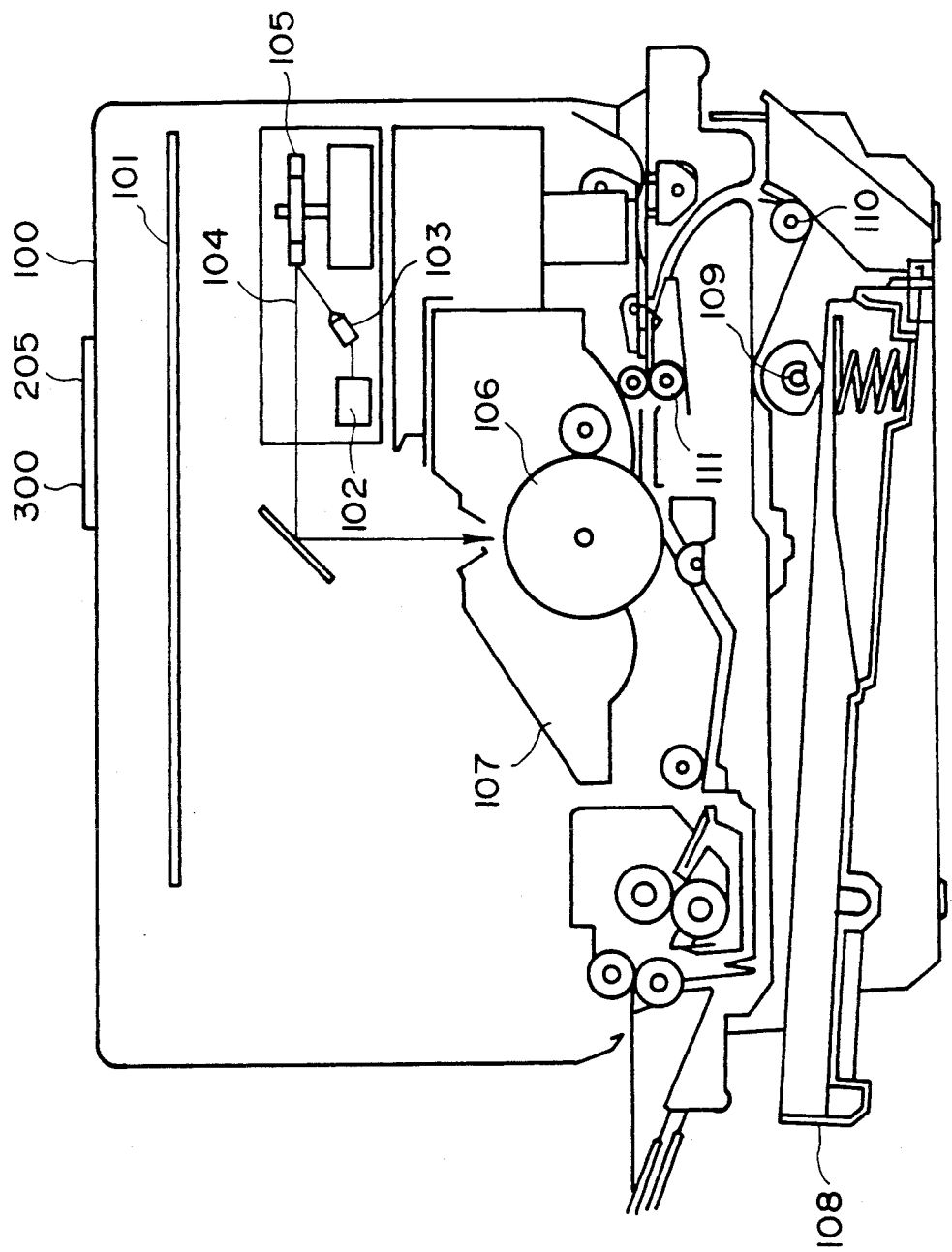
FIG. 2 is a cross-sectional view of the laser beam printer of said embodiment.

FIG. 2 is a cross-sectional view of the mechanism of a laser beam printer embodying the present invention.

In FIG. 2, a laser beam printer 100 converts character information supplied from an externally connected host computer and forms an image on a recording sheet. An operation panel 300 is provided with a power switch etc. A printer control unit 101 controls the entire printer 100, and analyzes the character information and control commands supplied from the host computer. Said printer control unit 101 controls or monitors various mechanisms of the printer and converts the input character information into corresponding character patterns for supply to a laser driver 102. Said laser driver 102 is provided for controlling a semiconductor laser 103, and turns on and off a laser beam 104 emitted from the semiconductor laser 103 according to the input video signal.

The laser beam, after being deflected in a lateral direction by a rotary polygon mirror 105, irradiates a photosensitive drum 106, thereby forming a latent image of the character pattern thereon. Said latent image is rendered visible by a developing unit 107 provided along the photosensitive drum 106 and is transferred onto a recording sheet. Cut recording sheets are stored in a sheet cassette 108 mounted in the laser beam printer 100, and are supplied therefrom toward the photosensitive drum 106 by means of a feed roller 109 and transport rollers 110, 111.

CONTROL UNIT (FIG. 1)

Figure 1:
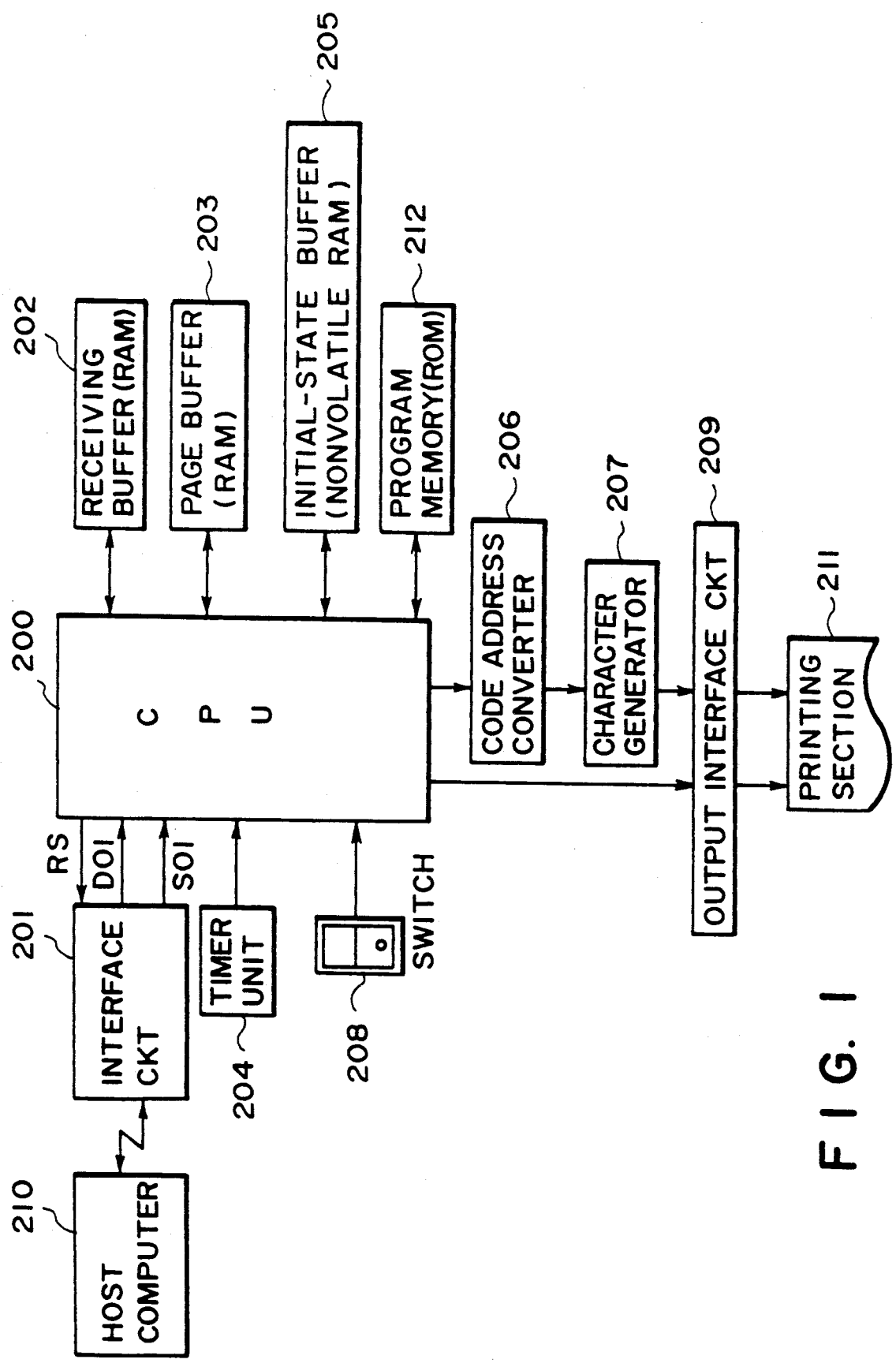
FIG. 1 is a block diagram of a printer control unit of a laser beam printer embodying the present invention.

FIG. 1 is a block diagram of the printer control unit 101.

Figure 4:
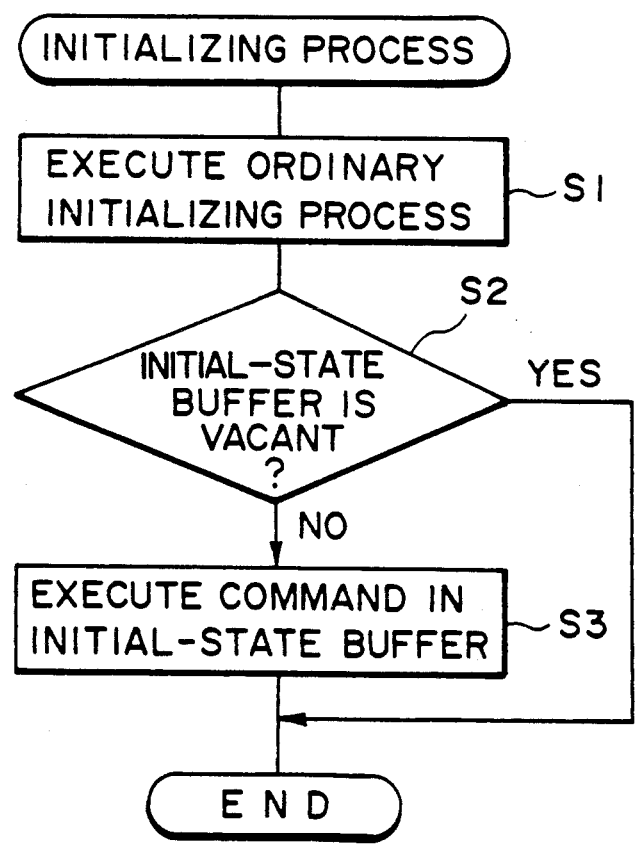
FIG. 4 is a flow chart showing an initializing sequence.
Figure 5:
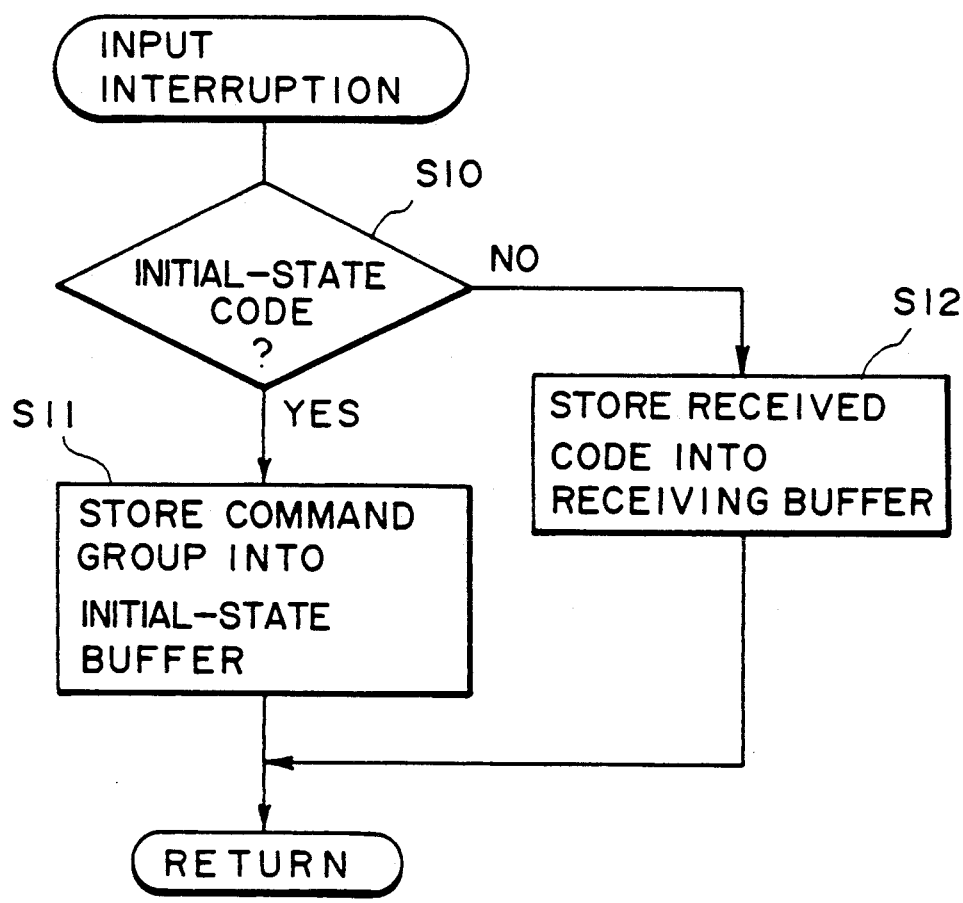
FIG. 5 is a flow chart showing an input interruption sequence.

In FIG. 1, a central processing unit (CPU) 200 has a ROM storing control programs corresponding to flow charts shown in FIGS. 4 and 5. When a power switch 208 for the printer control unit and the entire printer is turned on, a power-on reset signal is supplied to the CPU 200 whereby the CPU 200 executes an initializing program to set the laser beam printer in an initial state. Then the CPU 200 sends a request signal RS for the initializing conditions to an interface circuit 201, thus requesting a host computer 210 to transmit an instruction signal for the initializing conditions. In response the host computer 210 sends the instruction for the initializing conditions to the laser beam printer 100 and said conditions are stored in an initial-state buffer 205. Thus the laser beam printer 100 sets initializing conditions, corresponding to the stored conditions, in various ports of the printer.

If the initializing conditions need not be changed when the request signal RS is received (whether the initializing conditions are to be changed is up to the decision of the operator and is not an automatic function of the device), the host computer 210 releases a signal indicating that the change is unnecessary. Also in case no change is required, it is also possible not to release any signal from the host computer 210. It is therefore unnecessary to set the initializing conditions by sending the instruction again.

The print information sent from the host computer 210 to the laser beam printer 100 is in the form of codes.

Upon entry of the character codes from the host computer 210, an interruption signal S01 advising of said entry and a character code signal D01 are sent from the interface 201 to the CPU 200. A buffer RAM 202 is provided for temporarily storing the character code supplied from the host computer 210 through the CPU 200, which reads said character code signal D01 and temporarily stores said code in the buffer 202, according to an input interruption program started by the interruption signal S01. A page buffer RAM 203 edits thus entered character information into the unit of a page, and stores said information together with print format control information.

A timer unit 204, giving timer interruption signals to the CPU 200 at an interval for example of 100 mS, executes required tas switching control, by activating a timer interruption routine in a printer control program of multi-task process. An initial-state buffer 205, composed of a non-volatile RAM for storing instructions to be executed when the power supply is turned on, stores initializing conditions. A code address converter 206 is composed of a ROM and is provided for converting the character code data into the address of a corresponding character pattern. 207 is a character generator ROM provided in the laser beam printer 100.

At the printing operation, the character generator 207 converts the character information received from the page buffer 203 in the unit of a line at a time, into print signals of character patterns, and sends said signals to an output interface 209, which supplies a printing unit 211 with various control signals and the video signal. In response to a print start signal S03 from the CPU 200, the printing unit 211 is activated, and a print control sequence is conducted including a sheet supply, rotation of the photosensitive drum 106, activation of the laser driver 102 etc. A memory ROM 12 is provided for storing control program, etc.

INITIAL STATE COMMAND (FIG. 3)

Figure 3:
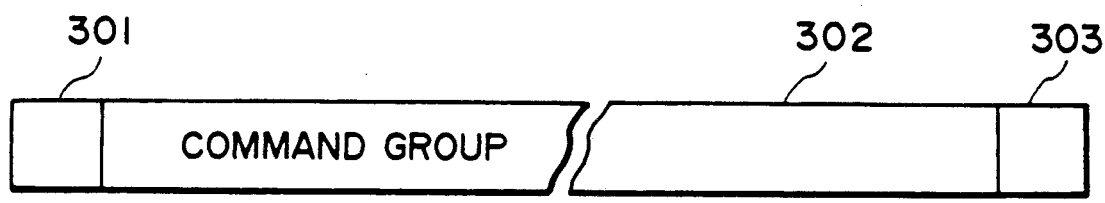
FIG. 3 is a view showing the format of an initializing command.

FIG. 3 shows the format of an initial state command supplied from the host computer 210 for storage in the initial state buffer 205 of the laser beam printer 100.

There are provided a command code 301 indicating that following data are instructions to be stored in the initial state buffer; a command code 303 indicating the end of said instructions; and an initial state instruction 302 to be actually stored in the initial state buffer 205. The initial state command 302 may contain any of the instructions that can be executed by said laser beam printer. More specifically said instruction may be that for page layout (margin, line pitch, character pitch, page direction etc.), that for font selection, that for form overlay, that for moving the print position, etc.

INITIALIZING PROCESS (FIG. 4)

FIG. 4 is a flow chart of an initializing sequence when the power switch 208 is turned on.

When said switch 208 is turned on, the CPU 200 at first executes, in a step S1, an ordinary initialization. The CPU releases an initializing instruction for the printer, and creates a standard state or a default state in which the operator does not set any conditions (margin, pitch, font, etc.) in the initial state buffer. The data of said standard state are stored in the program memory 212, and the standard state is set for example at the shipment from the manufacturer. Then the initializing request signal RS is sent to the host computer 210. Then a step S2 discriminates whether any instruction is already stored in the initial state buffer 205, and, if not, the sequence is terminated. In this manner the initial state is always maintained constant if the operator has not set any conditions in the initial state buffer 205.

On the other hand, if any instruction has been stored in the initial state buffer 205, the sequence proceeds to a step S3 to read the instruction a byte at a time from the initial state buffer 205, and said instruction is executed in succession. This operation is the same as the ordinary operation in which the CPU 200 reads the reception buffer 202 a byte at a time and forms the data for the page buffer 203 by executing thus read instruction, and is only different in that another buffer memory is used.

The initialization process is completed when all the contents of the initial state buffer 205 are executed. Thus an initial state desired by the operator can be arbitrarily generated without any burden.

DATA INPUT PROCESS (FIG. 5)

FIG. 5 is a flow chart of an input interruption process in response to the data reception from the host computer 210.

This process is started by the entry of the interruption signal S01 from the interface 201 in response to data reception, and a step S10 discriminates whether the received data contain the command code 301, i.e. whether said data are an initial state code. If an initial state code is identified, a step S11 stores the instruction data 302 in the initial state buffer 205 until the registration end code 303 is received. On the other hand, if no initial state code is not identified in the step S10, the sequence proceeds to a step S12 for storing the received code in the reception buffer 202, and the sequence is terminated.

In the present embodiment the initial state is stored in a non-volatile RAM, but there may be employed a detachable, rewritable non-volatile memory such as a floppy disk or an IC card.

Also instead of using the power switch for starting the initializations, there may be employed another panel switch or an initialization command from the host computer.

In the present embodiment the initialization request signal is sent from the printer to the host computer, but it is also possible to dispense with said request signal and to send a signal indicating the conditions to be set from the host computer only when the initially set conditions are to be changed.

As explained in the foregoing, in the present embodiment, once the initial state is formed by a command defining the initial state, it need not be reset thereafter unless the initial condition becomes different at the start of power supply, and the transition to the initial state specific to each user can be automatically made in an easy manner, so that various requirements of the user can be securely met.

In the following there will be explained an example of printer operation in response to the initial state command supplied from the host computer.

Figure 6:
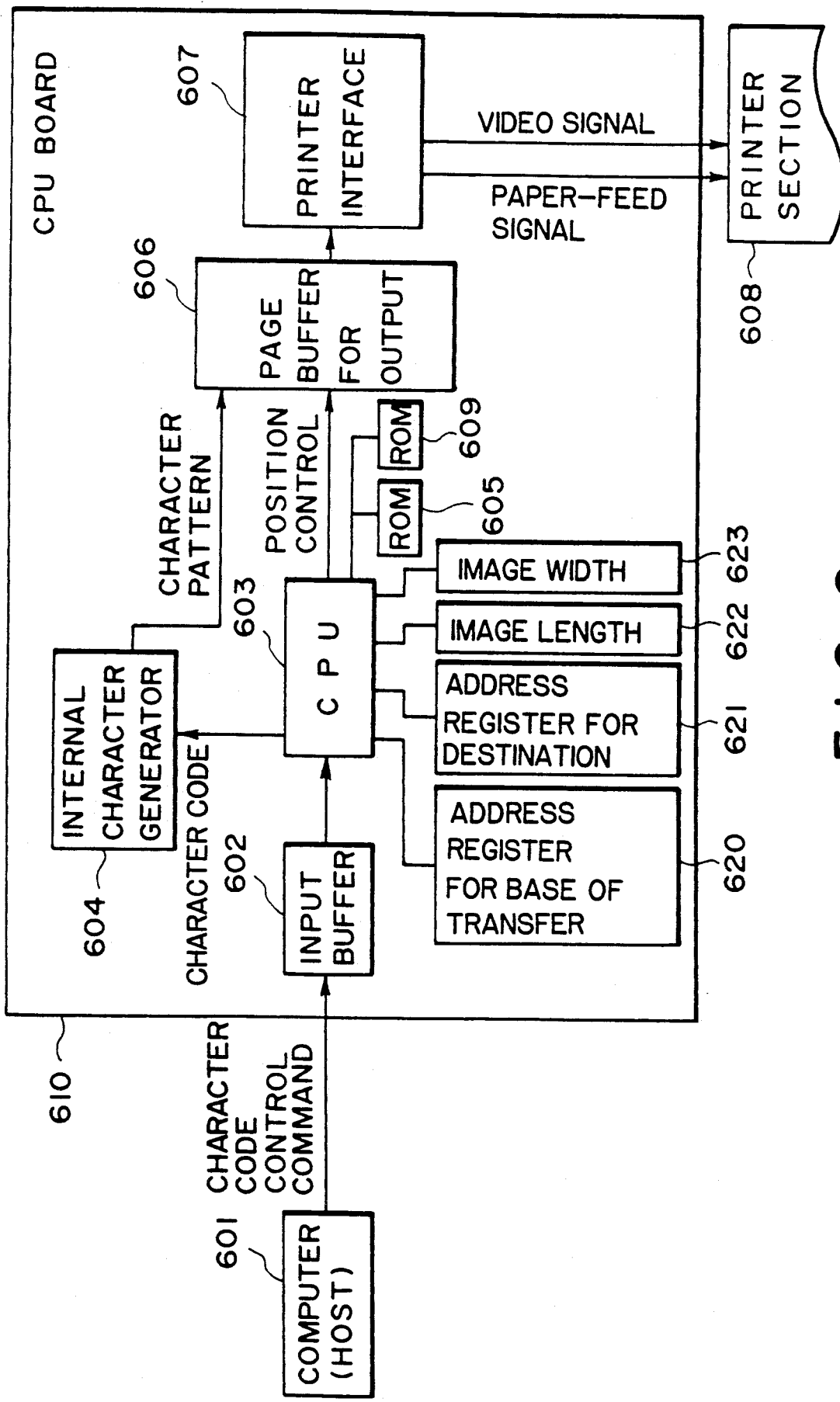
FIG. 6 is a block diagram of a recording apparatus embodying the present invention.

FIG. 6 is a block diagram of a recording apparatus embodying the present invention, and there will be explained a case of recording, with a displacement of position, character patterns (including symbols) with a page printer such as a laser beam printer, in response to character code data and control commands sent from the host computer. In FIG. 6 there are shown a host computer 601 for generating character code data and control commands to be explained later, corresponding to the host computer 210 shown in FIG. 1; a ROM 605 storing a control program; an auxiliary memory RAM 609; an input buffer 602 for temporarily storing the character code data and control commands; a CPU 603 composed of a general-purpose microprocessor; a character generator 604 for generating character patterns in response to the character code data; an originating address register 620 indicating the originating address; a destination address register 621 indicating the destination address; an image length register 622 indicating the length of the image to be transferred; an image width register 623 indicating the width of the image to be transferred; an output page buffer 606 composed of a RAM of a capacity equal to the number of dots of a page; a printer interface 607 serving as an interface with the printer and generating a video signal in response to dot information from the output page buffer 606; a printer 608 for forming an image in response to said video signal; and a control board 610.

The input information from the host computer 601 contains character codes, image data and control commands and is temporarily stored in the input buffer 602. The CPU 603 reads said input information from the input buffer 602. In the case of a character code, the CPU 603 sends said code to the character generator 604 to generate a corresponding pattern, which is stored in the output buffer 606 under the position control by the CPU 603. Image data are stored directly in the output page buffer 606.

Figures 7, 8:
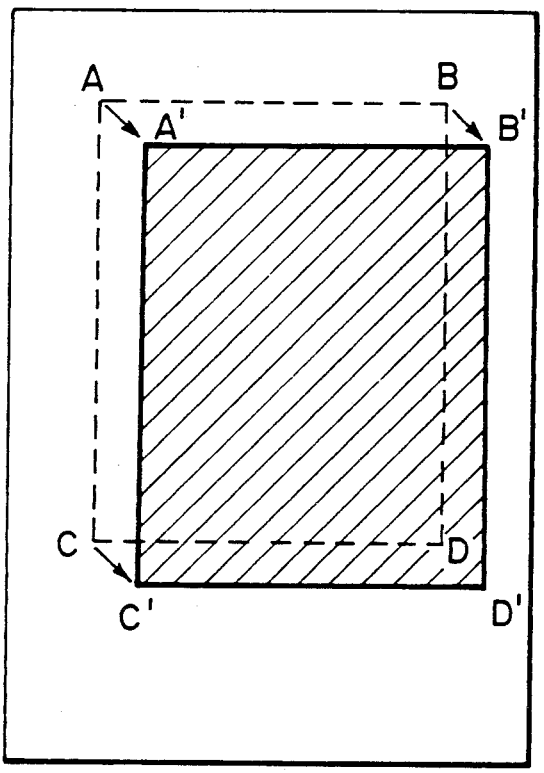
FIG. 7 is a view showing an image displacement in the recording apparatus of said embodiment.
FIG. 8 is a view showing the format of an image control command of the recording apparatus of said embodiment.
Figure 9:
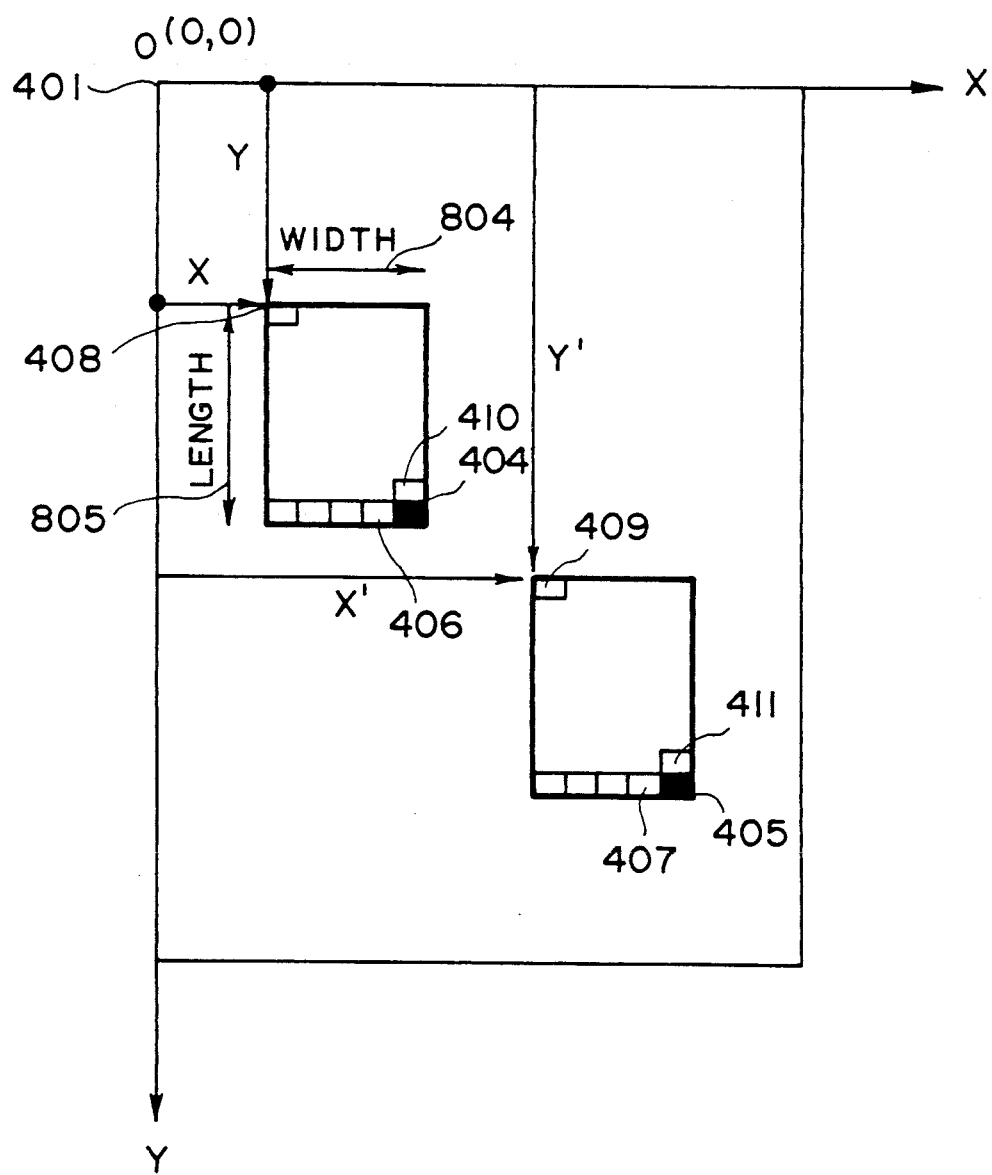
FIG. 9 is a view showing an image displacement or a copying in the recording apparatus of said embodiment.

FIG. 8 shows the format of an image control command, and FIG. 9 shows the structure of the output page buffer 606.

The output page buffer 606 has a capacity of one page. The upper left corner of the sheet is taken as the origin (0, 0), and the lateral and vertical directions are respectively taken as the X- and Y-axis. In FIG. 8, there are shown an identification code 801 indicating that it is an image movement command; X- and Y-coordinates (X, Y) 802, 803 of the upper left corner of the pattern before movement, corresponding to a position 408 on FIG. 9; a width 804 in the X-direction of the image to be moved; a length 805 in the Y-direction of the image to be moved; an X- and Y-coordinates 806, 807 of the upper left corner of the pattern after movement, corresponding to a position 409 on FIG. 9; an identification code 808 indicating an image copy command; and following data 802–807 similar to those following the image movement command 801.

Figure 10A:
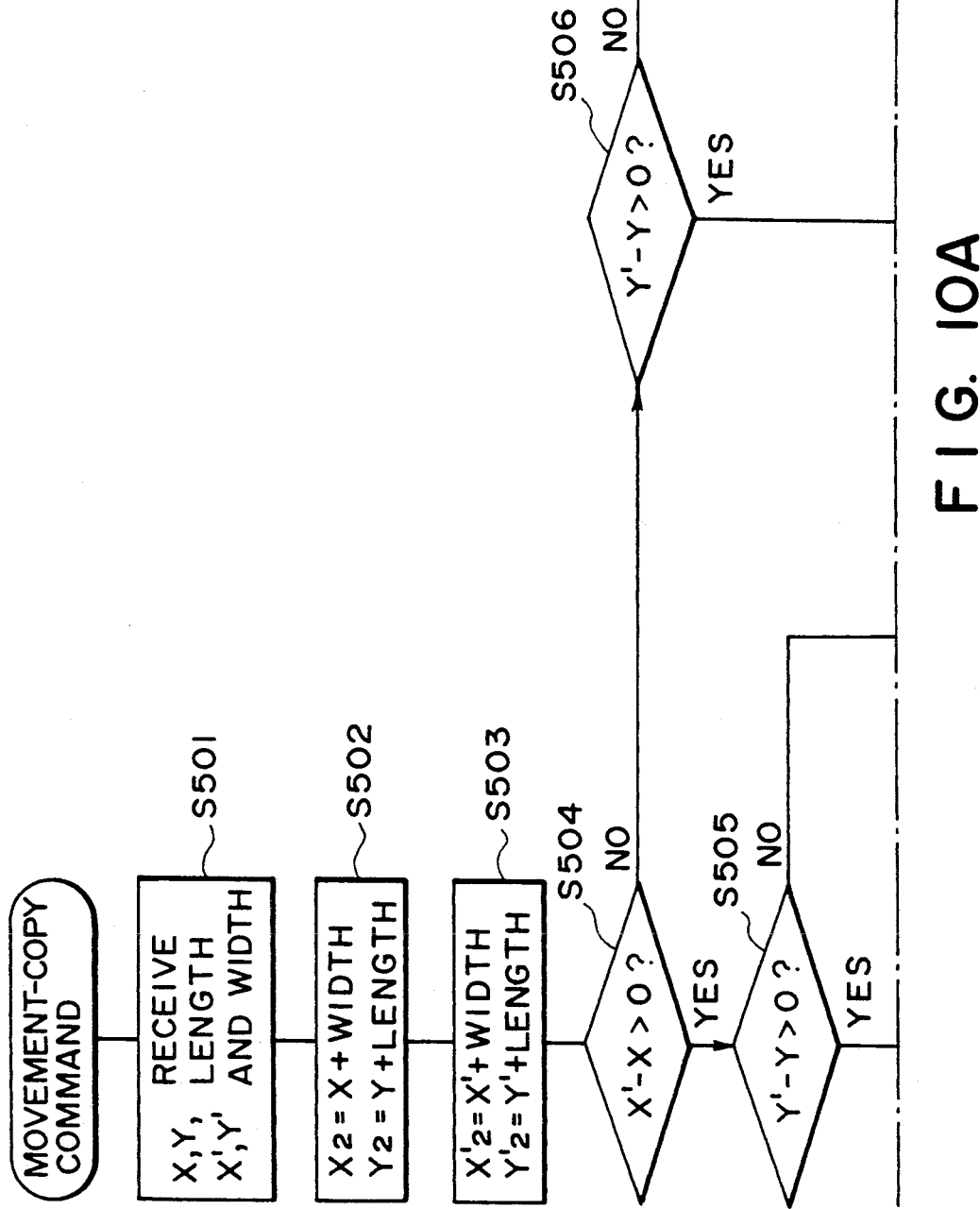
FIG. 10, consisting of FIGS. 10A, 10B and 10C, is a flow chart showing the function of the recording apparatus of said embodiment.

Now reference is made to a flow chart shown in FIG. 10, corresponding to a program stored in the ROM 605, for explaining the control sequence after the reception of an image movement command or an image copy command.

A step S501 reads the parameters of the image movement command or the image copy command shown in FIG. 8, and sets the X- and Y-coordinates (X, Y) 802, 803 of the upper left corner of the pattern before movement in the originating address register 620. Also the length 605 of the image and the width 804 are respectively stored in the image length register 622 and the image width register 623. A step S502 calculates the address (X2, Y2) of the lower right corner of the pattern before movement. Similarly a step S503 calculates the address (X'2, Y'2) of the lower right corner 405 of the pattern after movement. Steps S504–S506 identify the direction of movement from (X, Y) and (X', Y'). Based on the result of said identification of the direction of movement, steps S510–S519, or steps S520–S529, or steps S530–S539 are executed. In the following there will be explained the case of movement in a lower right direction (X'>X and Y'>Y).

A step S510 sets the addresses X2, Y2, X'2, Y'2, calculated in the steps S502 and S503, in work registers x, y, x' and y', which are provided in the CPU 603 but are not illustrated. A step S511 sets the content of the image length register 622 in a work register L, and step S512 sets the content of the image width register 623 in a work register W. Then a step S513 reads a byte of the lower right corner 404 of the coordinate (x, y) before movement, and writes it in the lower right corner 405 after movement indicated by the coordinate (x', y'). Then a step S514 discriminates whether a copying operation is instructed, and, if an image movement is instructed, a step S515 writes "0" in the data of the lower right corner 404 indicated by the coordinate (x, y), thus clearing the data located at the position of origin of transfer (404), i.e. the data of the original position is cleared. A step S516 then subtracts "1" from the count of the work registers x, x' and W, whereby the coordinate (x, y) indicates a position 406 adjacent, at left, to the lower right corner 404, and the coordinate (x', y') indicates a position 407 adjacent, at left, to the lower right corner 405. A step S517 then discriminates whether thus subtracted content of the image width work register W is "0". If not, steps S513–S517 are repeated.

In case said content is zero, indicating that the movement or copying in the X-direction is completed, a step S518 subtracts "1" from the count of the work registers y, y' and L, and returns the contents of the work registers x and x' to the original values x2, x'2. In this manner there are determined addresses of a position 410 immediately above the lower right corner 404 before movement and a position 411 immediately above the lower right corner 405 after movement. A step S519 discriminates whether the content of the length work register L is "0"; and, if not, steps S512–S519 are repeated.

If the content of said register L is zero, indicating that the movement or copying of all the image data in the designated area is completed, the process is terminated. In such moving or copying process, the original area and moved area may partially overlap as shown in FIG. 7.

In the following there will be explained overlaying of a form and print data. In the structure shown in FIG. 6, the pattern of the form and the pattern of the data may be separately stored in the output page buffer 106. In this case the form pattern is stored at first, and is then moved so as to match the data pattern as explained before, and is recorded in overlay with the data pattern. Also if a buffer for storing the form pattern is provided in the circuit shown in FIG. 6, the overlay can be easily achieved by the movement of either the form pattern or the data pattern.

In the foregoing embodiment the address of the upper left corner of the pattern before movement is used as reference, but it is also possible to use the address of one of other three corners for the same purpose.

Also the host computer may be replaced by a reader unit for generating electric signals by reading an original image.

The present invention is not limited to the foregoing embodiment but is subject to various modifications and variations within the scope and spirit of the appended claims.

We claim:

1. A recording apparatus for recording information based on recording information generated by a generating apparatus which generates information to be recorded, said recording apparatus comprising:

setting means for setting a recording format at a time when the recording information generated by the generating apparatus is recorded on a recording medium;

a non-volatile memory for storing recording format information, if any, generated by the generating apparatus, said non-volatile memory being capable of clearing data stored therein; and recording means for recording on the recording medium the recording information generated by the generating apparatus, based on the recording format set by said setting means, wherein said setting means sets different recording formats in response to whether or not recording format information has been stored in said non-volatile memory and wherein said setting means sets recording format based on recording format information stored in said non-volatile memory when recording format information generated by the generating apparatus has been stored in said non-volatile memory, and said setting means sets a default value of recording format when recording format information has not been stored in said non-volatile memory.

2. A recording apparatus according to claim 1, wherein said memory is detachable from the recording apparatus.

3. A recording apparatus according to claim 1, wherein said setting means includes a second memory in which said default value of the recording format information has been stored.

4. A recording apparatus according to claim 1, wherein said setting means sets a character pitch.

5. A recording apparatus according to claim 1, wherein said setting means sets a line pitch.

6. A recording apparatus according to claim 1, wherein said setting means determines, upon initialization of said recording apparatus, whether or not the recording format information has been stored in said memory.

7. A recording apparatus according to claim 1, wherein an initialization of said recording apparatus is executed upon turning on said recording apparatus.

8. A recording apparatus for recording information based on recording information generated by a generating apparatus which generates information to be recorded, said recording apparatus comprising:

storing means for storing the recording information generated by the generating apparatus;

recording means for recording on a recording medium the recording information stored in said storing means; and control means for controlling said storing means such that said storing means changes storing position of the recording information which has been already stored in said storing means, based on a movement instruction generated by the generating apparatus in order to record the recording information stored in said storing means at a different position on the recording medium.

9. A recording apparatus according to claim 8, wherein the movement instruction includes data regarding a position of origin of transfer and data regarding a position of transfer destination.

10. A recording apparatus according to claim 9, wherein said control means determines a movement starting address of the recording information based on both the data regarding position of origin of transfer and the data regarding a position of transfer destination.

11. A recording apparatus according to claim 8, wherein said storing means stores the recording information as a dot pattern.

12. A recording apparatus according to claim 8, wherein said control means moves the recording information stored in said storing means, a predetermined number of bits at a time.

13. A recording apparatus according to claim 8, wherein said storing means stores recording information corresponding to up to a single page.

14. A recording apparatus for recording information based on recording information generated by a generating apparatus which generates information to be recorded, said recording apparatus comprising:
   storing means for storing the recording information generated by the generating apparatus;
   recording means for recording on a recording medium the recording information stored in said storing means; and
   control means for controlling said storing means such that said storing means copies the recording information stored in said storing means into an address designated by said storing means, based on a copying instruction generated by the generating apparatus in order also to record the recording information stored in said storing means at a different position on the recording medium.

15. A recording apparatus according to claim 14, wherein the copying instruction includes data regarding a position of origin of copying and data regarding a position of copying destination.

16. A recording apparatus according to claim 15, wherein said control means determines a copy starting address of the recording information based on both the data regarding a position of origin of copying and the data regarding a position of copying destination.

17. A recording apparatus according to claim 14, wherein said storing means stores the recording information as a dot pattern.

18. A recording apparatus according to claim 14, wherein said control means allows the recording information stored in said storing means to be copied, a predetermined number of bits at a time.

19. A recording apparatus according to claim 14, wherein said storing means stores recording information corresponding to up to a single page.

20. A recording apparatus for recording information based on recording information generated by a generating apparatus which generates information to be recorded, said recording apparatus comprising:
   first setting means for setting a default value of recording format at a time when the recording information generated by the generating apparatus is recorded on a recording medium;
   second setting means for setting a recording format different from the default value of recording format set by said first setting means, wherein said second setting means has a non-volatile memory for storing recording format information associated with the recording format to be set by said second setting means and said non-volatile memory is capable of clearing data stored therein;
   changing means for changing the recording format information stored in said memory, based on control information, if any, generated by the generating apparatus; and
   recording means for recording on the recording medium the recording information generated by the generating apparatus, based on the recording format set by a selected one of said first setting means and said second setting means.

21. A recording apparatus according to claim 20, further comprising selecting means for selecting said first setting means when recording format information has not been stored in said memory and for selecting said second setting means when recording format information has been stored in said memory.

22. A recording apparatus according to claim 20, wherein the recording format information includes information indicative of a character pitch.

23. A recording apparatus according to claim 20, wherein said recording format information includes information indicative of line pitch.

24. A recording apparatus according to claim 20, wherein said first setting means includes a second memory in which said default value of the recording format information has been stored.

25. A recording apparatus according to claim 20, wherein said selecting means selects one of said first and second setting means upon initialization of said recording apparatus.

26. A recording apparatus according to claim 25, wherein an initialization of said recording apparatus is executed upon turning on said recording apparatus.

* * * * *

UNITED STATES PATENT AND TRADEMARK OFFICE
CERTIFICATE OF CORRECTION

PATENT NO. : 5,058,035
DATED : October 15, 1991
INVENTOR(S) : SATOSHI NAGATA, ET AL.

It is certified that error appears in the above-identified patent and that said Letters Patent is hereby corrected as shown below:

ON THE TITLE PAGE,
IN [56] REFERENCES CITED

U.S. PATENT DOCUMENTS, "4,170,886 12/1983 Heath" should read --4,710,886 12/1987 Heath--.

SHEET 9 OF 10

Figure 10B:
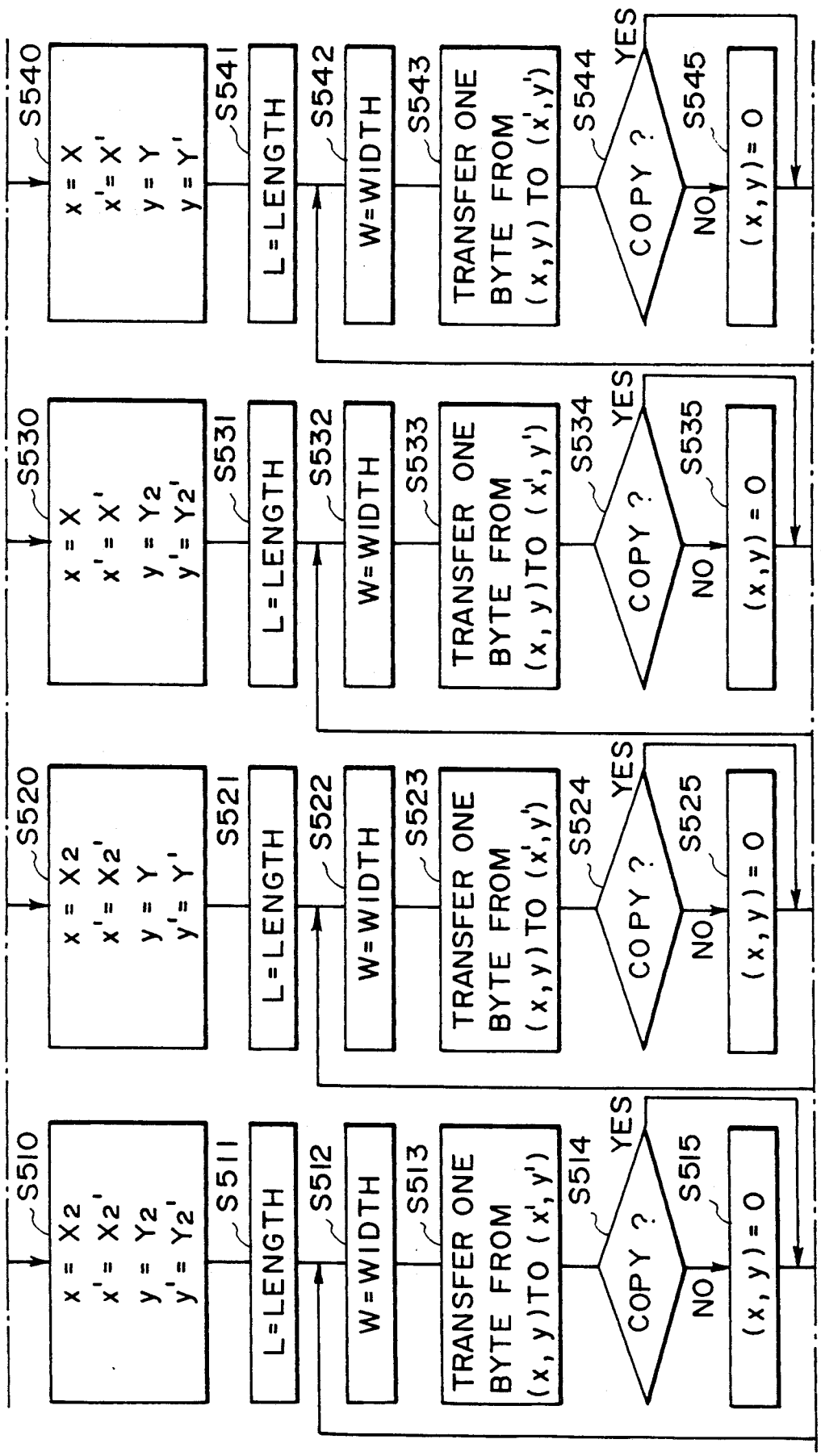

FIG. 10B, " S521 / [L = LENGTH] " should read -- S521 / [L = LENGTH] --.

SHEET 10 OF 10

Figure 10C:
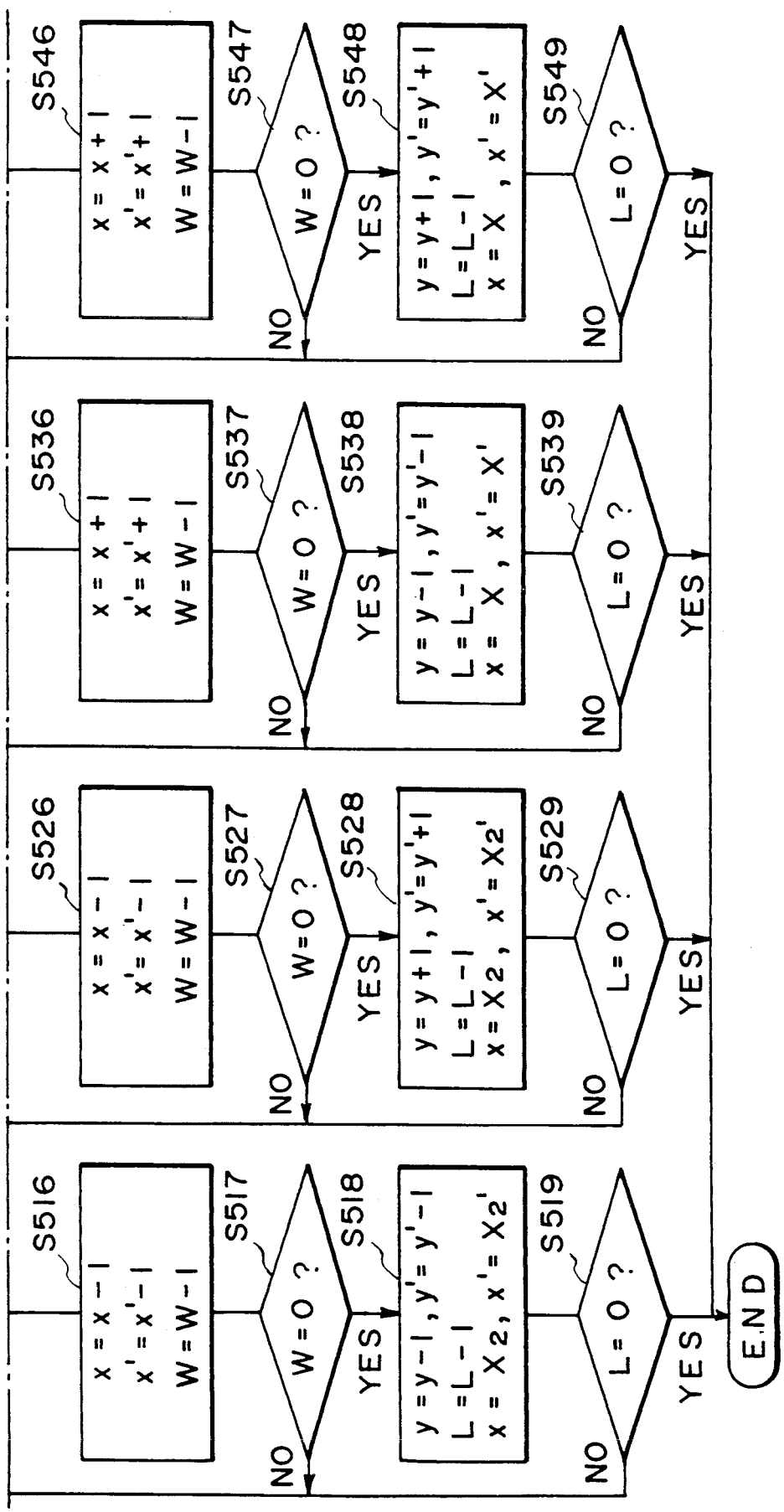

FIG. 10C, " S538 / [$y = y - 1, y^1 = y^1 - 1$] " should read -- S538 / [$y = y - 1, y^1 = y^1 - 1$] --.

COLUMN 4

Line 5, "tas" should be deleted.
Line 25, "memory ROM 12" should read --memory ROM 212--.

COLUMN 5

Line 20, "not" should be deleted.
Line 41, "condition becomes" should read --conditions become--.

UNITED STATES PATENT AND TRADEMARK OFFICE
CERTIFICATE OF CORRECTION

PATENT NO. : 5,058,035
DATED : October 15, 1991
INVENTOR(S) : SATOSHI NAGATA, ET AL.

It is certified that error appears in the above-identified patent and that said Letters Patent is hereby corrected as shown below:

COLUMN 6

Line 32, "an X- and Y-coordinates 806, 807" should read --X'- and Y'-coordinates 806, 807--.
    Line 48, "length 605" should read --length 805--.

COLUMN 7

Line 38, "output page buffer 106." should read --output page buffer 606.--.

Signed and Sealed this

Sixteenth Day of March, 1993

Attest:

STEPHEN G. KUNIN

Attesting Officer    Acting Commissioner of Patents and Trademarks